United States Patent [19]

Kawai et al.

[11] Patent Number: 5,016,524
[45] Date of Patent: May 21, 1991

[54] SEALING ARRANGEMENT FOR A PISTON IN A COMPRESSOR

[75] Inventors: Katsunori Kawai; Hayato Ikeda; Shinichi Ishihara; Toshihiro Kawai, all of Kariya, Japan

[73] Assignee: Kabushiki Kaisha Toyoda Jidoshokki Seisakusho, Aichi, Japan

[21] Appl. No.: 491,351

[22] Filed: Mar. 9, 1990

[30] Foreign Application Priority Data

Mar. 14, 1989 [JP] Japan .................. 01-28739[U]

[51] Int. Cl.$^5$ .............................. F01B 31/00
[52] U.S. Cl. .................... 92/182; 92/206; 92/207; 92/247; 29/888.07; 29/888.073; 277/173; 277/176; 277/168; 277/74; 277/78
[58] Field of Search .............. 92/201, 204, 205, 206, 92/207, 247, 248, 250, 251, 126, 182; 277/71, 74, 78, 173, 176, 168, 170; 29/888.07, 888.073

[56] References Cited

U.S. PATENT DOCUMENTS

| | | | |
|---|---|---|---|
| 1,546,526 | 7/1925 | Wasson | 29/888.073 |
| 2,615,769 | 10/1952 | Barnes et al. | 277/78 |
| 2,862,736 | 12/1958 | Russell | 277/173 |
| 2,892,645 | 6/1959 | Tydeman | 277/78 |
| 2,914,368 | 11/1959 | Farmer et al. | 277/79 |
| 3,023,014 | 2/1962 | Donner | 277/78 |
| 3,632,121 | 1/1972 | Wahlmark | 277/176 X |
| 3,834,719 | 9/1974 | Shin et al. | 92/182 X |
| 3,885,460 | 5/1975 | Park | 92/249 |
| 4,351,227 | 9/1982 | Copp, Jr. et al. | 92/71 |
| 4,577,870 | 3/1986 | Scott et al. | 277/78 X |

FOREIGN PATENT DOCUMENTS 2076072 11/1981 United Kingdom .................. 92/248

Primary Examiner—John T. Kwon
Assistant Examiner—John Ryznic
Attorney, Agent, or Firm—Burgess, Ryan & Wayne

[57] ABSTRACT

A continuous seal ring member fitted in a ring groove of a piston of a compressor. The seal ring member has a washer-like initial shape with an internal diameter smaller than an outer diameter of the piston, whereby the inner peripheral portion of the seal ring member is expanded when the seal ring member is fitted in the ring groove. The outer peripheral portion of the ring seal member is then axially and inwardly collapsed relative to the inner peripheral portion thereof so that one of the side surfaces of the initial seal ring member constitutes an outer sealing surface for engagement with the cylinder bore and the outer peripheral portion in the original shape is arranged on the side of said compression chamber. A backup ring member fitted in the ring groove on the side of the continuous seal ring member remote from the compression chamber has a surface area abutting against the side surface of the ring groove on the side remote from the compression chamber and sufficient to retain the continuous seal ring member in the ring groove.

7 Claims, 3 Drawing Sheets

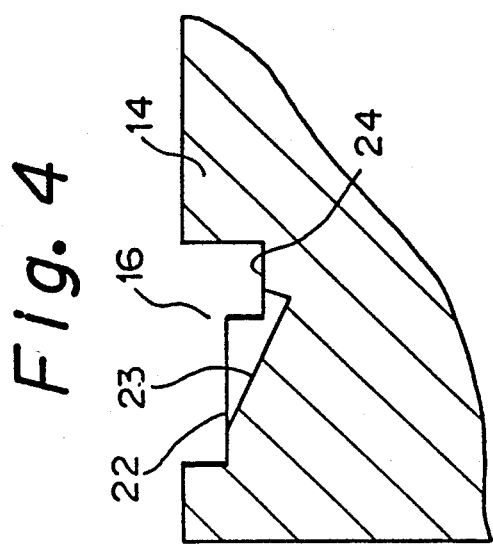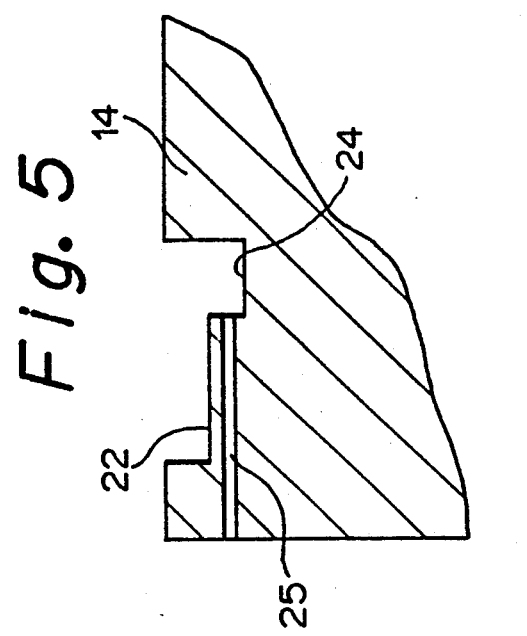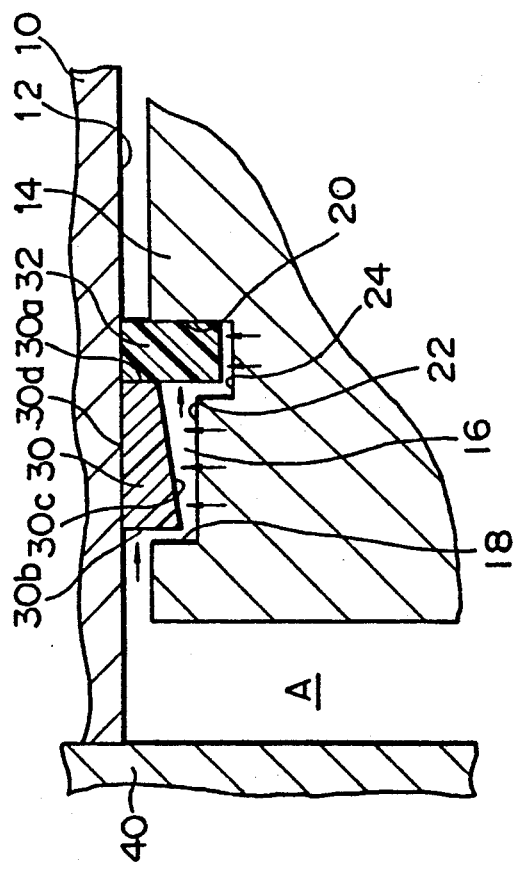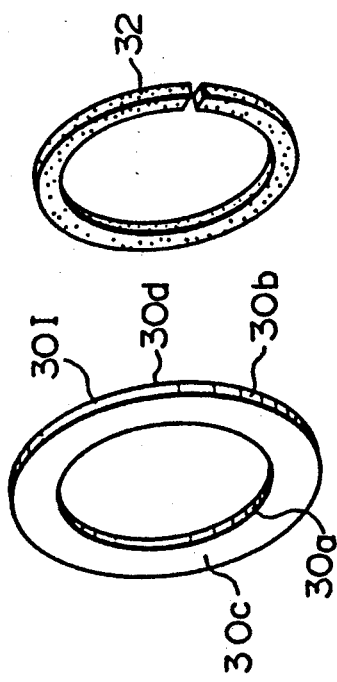

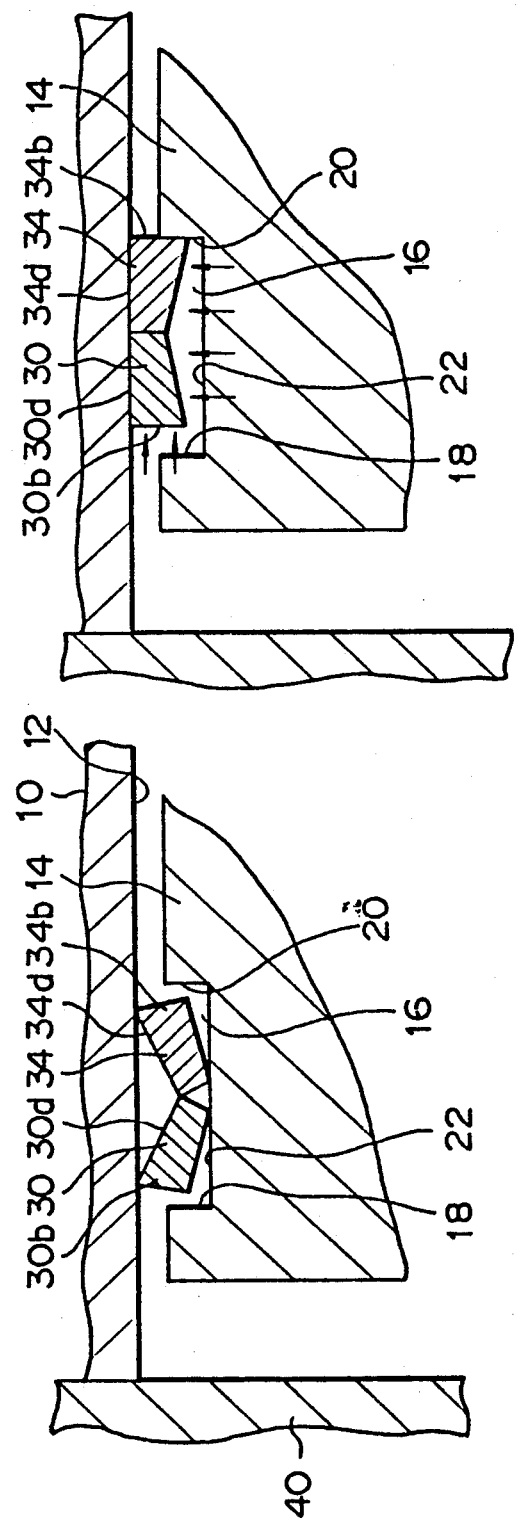

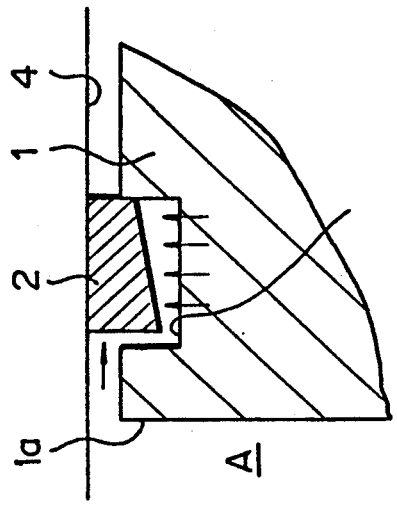
Fig. 8D
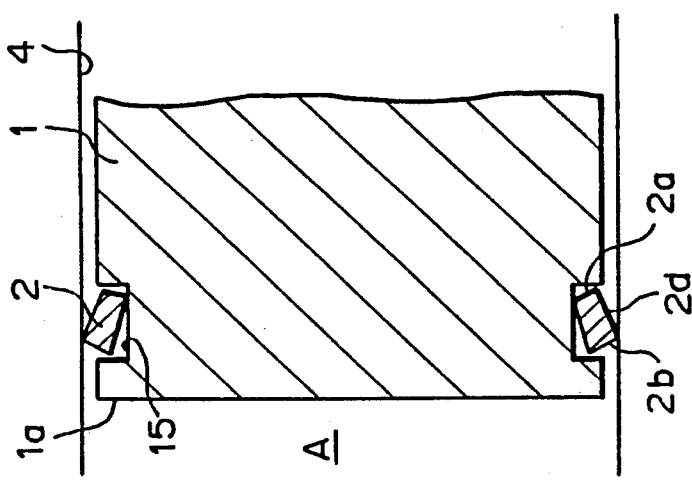
Fig. 8C
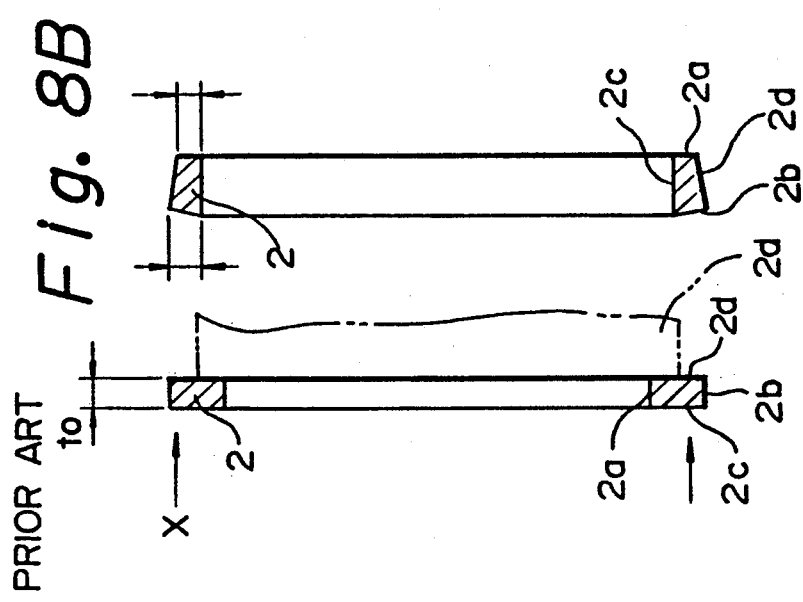
Fig. 8A PRIOR ART
Fig. 8B

SEALING ARRANGEMENT FOR A PISTON IN A COMPRESSOR

BACKGROUND OF THE INVENTION

1. Field of the Invention

The present invention relates to a piston in a compressor, and in particular, it relates to an improvement of a sealing arrangement of a piston in a compressor such as used in an air conditioning system.

2. Description of the Related Art

In a compressor, a piston seal ring is provided in a ring groove of a piston to seal an annular gap between the piston and the cylinder bore. A typical piston seal ring is a discontinuous metal ring with a slit and can be used under tension. Recently, a continuous plastic seal ring has been developed, as disclosed in U.S. Pat. No. 4,351,227. Such a continuous plastic seal ring is referred to as a washer-like seal ring, and examples thereof are shown in FIGS. 8A and 8B of the attached drawings. The washer-like continuous seal ring 2 has an initial shape with a relatively thin width $t_0$, like a washer used in various mechanical fields, as shown in FIG. 8A, and in use is deformed into a generally barrel-like shape, as shown in FIG. 8B. The initial seal ring 2 has an inner peripheral portion 2a, an outer peripheral portion 2b, and side surfaces 2c and 2d; the internal diameter of the inner peripheral portion 2a being smaller than an outer diameter of a piston 1 on which the seal ring 2 is to be attached Accordingly, the inner peripheral portion 2a of the seal ring 2 is radially expanded when the seal ring 2 is urged toward the piston 1, for example, in the direction of the arrow X, to fit the seal ring 2 in a ring groove of the piston 1.

When the seal ring 2 falls in the ring groove, it is further deformed, for example, by a suitable conical tool, in the reverse direction to the arrow X and the outer peripheral portion 2b is axially and inwardly collapsed relative to the inner peripheral portion 2a, so that one of the side surfaces 2d of the initial washer-like seal member 2 changes to an outer sealing surface of a barrel-like ring member 2 to be engaged with an inner surface of a cylinder bore in which the piston 1 is to be inserted. In this final shape, one of the side surfaces 2b (i.e., the outer peripheral portion 2b of the initial washer-like seal ring 2) has a thickness $t_1$, which is generally equal to the width $t_0$ of the initial seal ring 2, but the other side surface 2a (i.e., the inner peripheral portion 2a of the initial washer-like seal ring 2) has a reduced thickness $t_2$ because the inner peripheral portion 2a has expanded. This seal ring 2 is advantageously used in a position, as shown in FIG. 8C, in which the thick side surface 2b is arranged on the side of the compression chamber A, i.e., on the side of the piston head 1a, to increase a sealing function of the compressed gas in the compression chamber A, and the thin side surface 2a is arranged on the opposite side. As shown in FIG. 8D, this barrel-like ring member 2 receives the high pressure of the compressed gas in the compression chamber A during a compression stroke of the compressor from the inner peripheral surface thereof, and is radially expanded into close contact with the inner surface of the cylinder bore 4. In this way, the barrel-like ring member 2 can hermetically slide in the inner surface of the cylinder bore 4 to provide a good sealing function, and be retained in the ring groove 15 by an abutting thereof against the side surface of the ring groove 15.

It will be understood that arrangement of the seal ring member 2 so that the thick side surface 2b faces toward the compression chamber A, as shown in FIG. 8C, is intended to minimize an outer clearance between the seal ring member 2 and the inner surface of the cylinder bore 4 (preferably to zero) and to provide an inner clearance between the seal ring 2 and the bottom of the ring groove 15 such that an escape of the compressed gas from the compression chamber A toward the unti-pistonhead area is prevented and is held in an inner gap between the inner surface of the seal ring 2 and the bottom of the ring groove 1 during the compression stroke of the compressor.

Nevertheless, the arrangement of the seal member 2 fitted in the ring groove 15 causes a problem in that the thickness $t_2$ of the thin side surface 2a is reduced not only by the initial expansion of the inner peripheral portion 2a during insertion of the seal ring member 2 but also by a further expansion during the compression stroke of the compressor by the internally applied high pressure of the compressed gas, and thus the seal ring member 2 does not remain in the ring groove 15 and may be forced out into a gap between the inner surface of the cylinder bore 4 and the seal ring. 2.

SUMMARY OF THE INVENTION

An object of the present invention is to solve the above described problems and to provide a sealing arrangement for a piston in a compressor by which a good sealing function is obtained by a continuous seal ring member which is securely retained in the ring groove thereof.

According to the present invention, there is provided a sealing arrangement for a piston in a compressor having a cylinder block with a cylinder bore formed therein to axially displaceably accommodate the piston, and a cylinder head attached to the cylinder block and forming a compression chamber on one side of the piston. The sealing arrangement comprises means for forming a ring groove on an outer surface of the piston, the ring groove comprising opposite side surfaces and a bottom surface between the side surfaces; a continuous seal ring member fitted in the ring groove, the seal ring member having an initial shape provided with an internal diameter smaller than an outer diameter of the outer surface of the piston, an inner peripheral portion, and an outer peripheral portion whereby at least the inner peripheral portion expands when the seal ring member is fitted in the ring groove beyond the outer surface of the piston and the outer peripheral portion is axially and inwardly collapsed relative to the inner peripheral portion so that one of the side surfaces of the initial seal ring member constitutes an outer sealing surface for engagement with an inner surface of the cylinder bore, and the outer peripheral portion in the original shape is arranged on the side of the compression chamber; and a backup ring member fitted in the ring groove on the side of the continuous seal ring member remote from the compression chamber, the backup ring member having a surface area abutting against the side surface of the ring groove on the side remote from the compression chamber sufficient to retain the continuous seal ring member in the ring groove.

With this arrangement, a good sealing function is attained by the continuous seal ring member, which is usually expanded by the internal back pressure during the compression stroke of the compressor, so that the entire outer sealing surface can be brought into close contact with the inner surface of the cylinder bore for a sliding engagement therebetween.

The piston may repeat a compression stroke and a suction stroke in the cylinder bore. In the compression stroke, the continuous seal ring member is expanded and comes into close contact with the inner surface of the cylinder bore, but the backup ring member is fitted in the common ring groove so as to abut against the side surface of the ring groove on the side remote from the compression chamber with an abutting surface area sufficient to retain the continuous seal ring member in the ring groove in position therein. Accordingly, the continuous seal ring member is not forced out into a gap between the inner surface of the cylinder bore and the continuous seal ring member, even if one end of the continuous ring seal member is relatively thin and radially expanded by the compressed gas.

BRIEF DESCRIPTION OF THE DRAWINGS

The present invention will become more apparent from the following description of the preferred embodiment with reference to the accompanying drawings; in which:

FIG. 1 is a partial cross-sectional view of a sealing arrangement for a piston in a compressor according to the first embodiment of the present invention;

FIG. 2 is a perspective view of an initial shape of the continuous seal ring member of FIG. 1;

FIG. 3 is a perspective view of the backup ring member of FIG. 1;

FIG. 4 is a partial cross-sectional view of a modified seal ring member;

FIG. 5 is a partial cross-sectional view of a further modified seal ring member;

FIG. 6 is a partial cross-sectional view of a sealing arrangement for a piston in a compressor according to the second embodiment of the present invention;

FIG. 7 is a view similar to FIG. 6, showing the seal ring member and the backup ring member during a compression stroke of the compressor; and, FIG. 8A to 8D are views illustrating conventional sealing arrangement.

DESCRIPTION OF THE PREFERRED EMBODIMENT

FIG. 1 shows a part of compressor which includes a cylinder block 10 with a cylinder bore 12 and a piston 14 axially displaceably inserted in the cylinder bore 12. The piston 14 has a ring groove 16 on an outer surface thereof in which a continuous seal ring 30 and a backup ring 32 are fitted. A cylinder head 40 is attached to the cylinder block 10 to form a compression chamber A on one side of the piston 14. An additional cylinder head may be attached to the cylinder block 10 to form an additional compression chamber on the opposite side of the piston 14, in a known manner.

The ring groove 16 has opposite side surfaces 18 and 20, and stepped bottom surfaces 22 and 24 between the side surfaces 18 and 20. The first side surface 18 and the first bottom surface 22 are one the side of the compression chamber A, and the second side surface 20 and the second bottom surface 24 are on the side remote from the compression chamber A. The second bottom surface 24 is lower than the first bottom surface 22 and the backup ring 32 is located in a portion of the ring groove 16 around the second bottom surface 24. The continuous seal ring 30 is located in a portion of the ring groove 16 generally around the first bottom surface 22.

In this embodiment, the backup ring 32 is a discontinuous ring, preferably made of a plastic material, as shown in FIG. 3. The backup ring 32 has opposite ends and can be compressed by the inner surface of the cylinder bore 12 when the piston 14 is inserted in the cylinder bore 12 and is brought into contact with the inner surface of the cylinder bore 12. The backup ring 32 has a surface area abutting against the second side surface 20 of the ring groove 16 sufficient to retain the continuous seal ring 30 in the ring groove 16; i.e., the backup ring 32 when compressed by the inner surface of the cylinder bore 12 extends more radially inward than the side surface of the continuous seal ring 30, which abuts against the second side surface 20 of the ring groove 16 if the backup ring 32 is not provided.

The seal ring 30 is a continuous ring member made from a plastic material such as polytetrafluoroethylene. The seal ring 30 has a washer-like initial shape 30I, as shown in FIG. 2 and discussed previously. The washer-like initial shape 30I has an inner peripheral portion 30a, an outer peripheral portion 30b, and side peripheral portion 30a being smaller than the outer diameter of the piston 14, and thus the inner peripheral portion 30a of the seal ring 30 is radially expanded when the seal ring 30 is urged toward the pistonhead of the piston 14 to fit the seal ring 30 in the ring groove 16. When the seal ring 30 falls in the ring groove 16, it is further deformed into a barrel-like shape so that the outer peripheral portion 30b is axially and inwardly collapsed relative to the inner peripheral portion 30a, and the thick outer peripheral portion 30b faces toward the compression chamber A as shown in FIG. 1. In this position, the side surface 30d of the initial washer-like seal ring 30 changes to an outer sealing surface to be engaged with the inner surface of the cylinder bore 12.

The seal ring 30 and the backup ring 32 receive the high pressure of the compressed gas in the compression chamber A during a compression stroke of the compressor, as shown by the arrows in FIG. 1, and thus the seal ring 30 is expanded toward the inner surface of the cylinder bore 12 and moved toward and abutted against the backup ring 32. The backup ring 32 is abutted against the second side surface 20 of the ring groove 16 by the sufficient surface area, and thus retains the continuous seal ring 30 in the ring groove 16 even if the thickness of the side surface 30a of the seal ring 30 (formerly the inner peripheral portion 30a of the washer-like initial shape 30I) is reduced due to the expansion thereof by the high pressure in the compression chamber A. The backup ring 32 in this embodiment comprises a discontinuous ring which is easily expanded by the pressure in the compression chamber A from an earlier stage of a compression stroke, to be brought into contact with the inner surface of the cylinder bore 12 and securely retain the seal ring 30. The backup ring 32 as well as the seal ring 30 slides on the inner surface of the cylinder bore 12, and thus the sealing function is further improved. In this regard, the sealing function is still further improved of the backup ring 32 as a continuous ring.

To facilitate the outward deformation of the backup ring 32, it is possible to arrange a slot or a plurality of slots 23 in the ring groove 16, which extends form the first bottom surface 22 to the second bottom surface 24, to apply pressure by the compressed gas to the inner surface of the backup ring 32 as shown in FIG. 4.

Also, it is possible to arrange a slot or a plurality of slot 25 in the ring groove 16, which extends from the end surface of the pistonhead to the second bottom surface 24, to apply pressure by the compressed gas to the inner surface of the backup ring 32 to facilitate the outward deformation of the backup ring 32 as shown in FIG. 5.

FIGS. 6 and 7 show the second embodiment of the present invention. The ring groove 16 in this embodiment comprises a single broad groove in which a seal ring 30 and a backup ring 34 are fitted. The seal ring 30 is formed from a washer-like initial shape similar to the washer-like initial shape 30I shown in FIG. 2, and thereafter, deformed into a barrel-like shape in a manner previously described. Therefore, the seal ring 30 has an outer sealing surface 30d derived from a side surface 30d of the initial shape 30I. A thick side surface 30b derived from an outer peripheral portion 30b of the initial shape 30I faces toward the compression chamber A. The other thin side surface is derived from an inner peripheral portion 30a of the initial shape 30I and arranged on the side of the second side surface 20 of the ring groove 16. An inner surface is derived from the In this embodiment, the backup ring 34 comprises a continuous ring member similar to the seal ring 30. Therefore, the backup ring 34 has a similar initial shape to the washer-like initial shape 30I shown in FIG. 2 and thereafter deformed into a barrel-like shape, in which an outer sealing surface 34d is derived from a side surface 30d of the initial shape 30I, a thick side surface 34b is derived from an outer peripheral portion 30b of the initial shape 30I, the other thin side surface is derived from an inner peripheral portion 30a of the initial shape 30I, and an inner surface is derived from the other side surface 30c of the initial shape 30I. Note, the thick side surface 34b derived from an outer peripheral portion 30b of the initial shape 30I is arranged on the side of the second side surface 20 of the ring groove 16, to provide a surface area abutting against the second side surface 20 of the ring groove 16 on the side remote from the compression chamber A and sufficient to retain the continuous seal ring 30 in the ring groove 16.

In this arrangement, the seal ring 30 and the backup ring 34 receive the high pressure of the compressed gas in the compression chamber A during a compression stroke of the compressor, as shown by the arrows in FIG. 7, and thus the seal ring 30 and the backup ring 34 are expanded toward the inner surface of the cylinder bore and moved toward the second side surface 20 of the ring groove 16. The thick side surface 34b of the backup ring 34 abuts against the second side surface 20 of the ring groove 16 by the sufficient surface area, and thus retains the continuous seal ring 30 in the ring groove 16. Then in a suction stroke of the compressor, the thick side surface 30b of the seal ring 30 abuts against the first side surface 18 of the ring groove 16, and thus the seal ring 30 is retained in the ring groove 16. In this way, according to the present invention, it is possible to ensure a good sealing function by a continuous seal ring 30 which is securely retained by the backup ring 34 during a compression stroke and a suction stroke of the compressor.

We claim:

1. A sealing arrangement for a piston in a compressor having a cylinder block with a cylinder bore formed therein to axially displaceably accommodating said piston and a cylinder head attached to said cylinder block for forming a compression chamber on one side of said piston, the sealing arrangement comprising:

means for forming a ring groove on an outer surface of said piston, said ring groove comprising opposite side surfaces and a bottom surface between the side surfaces;

a continuous seal ring member fitted in said ring groove, said seal ring member having an initial shape provided with an internal diameter smaller than an outer diameter of said outer surface of said piston, an inner peripheral portion, and an outer peripheral portion whereby at least said inner peripheral portion is expanded when said seal ring member is fitted in said ring groove beyond said outer surface of said piston and said outer peripheral portion is axially and inwardly collapsed relative to said inner peripheral portion so that one of said side surfaces of the initial seal ring member constitutes an outer sealing surface for engagement with an inner surface of said cylinder bore and said outer peripheral portion in the original shape is arranged on the side of said compression chamber; and a backup ring member fitted in said ring groove on the side of said continuous seal ring member remote from said compression chamber, said backup ring member having a surface area abutting against said side surface of said ring groove on the side remote from said compression chamber and sufficient to retain said continuous seal ring member in said ring groove.

2. A sealing arrangement according to claim 1, wherein said backup ring member comprises a discontinuous ring with opposite ends.

3. A sealing arrangement according to claim 2, wherein said bottom of said ring groove is formed by first and second stepped bottom portions, said first bottom portion being on the side of said compression chamber and said second bottom portion being on the side remote from said compression chamber and lower than said first bottom portion, said backup ring member being inserted in said second bottom portion.

4. A sealing arrangement according to claim 3, wherein at least one slot extends from said first bottom portion to said second bottom portion to apply a pressure by the compressed gas to said backup ring member.

5. A sealing arrangement according to claim 3, wherein at least one slot extends from a pistonhead end surface of said piston to said second bottom portion to apply a pressure by the compressed gas to said backup ring member.

6. A sealing arrangement according to claim 1, wherein said backup ring member comprises a continuous ring.

7. A sealing arrangement according to claim 6, wherein said backup ring member has a similar initial shape to that of said continuous seal ring member and is thus provided with an internal diameter smaller than said outer diameter of said outer surface of said piston, an inner peripheral portion, and an outer peripheral portion, whereby at least said inner peripheral portion is expanded when said backup ring member is fitted in said ring groove beyond said outer surface of said piston and said outer peripheral portion is axially and inwardly collapsed relative to said inner peripheral portion so that one of said side surfaces of the initial backup ring member constitutes an outer sealing surface for engagement with said inner surface of said cylinder bore and said outer peripheral portion in the original shape is arranged on the side remote from said compression chamber.

* * * * *